Patented May 5, 1953

2,637,716

UNITED STATES PATENT OFFICE 2,637,716

EPOXY-RESIN, POLYCARBOXYLIC ACID POLYAMINE REACTION PRODUCTS

Gustav H. Ott, Riehen, Switzerland, assignor to Ciba Limited, Basel, Switzerland, a Swiss firm No Drawing. Application June 27, 1949, Serial No. 101,682. In Switzerland July 5, 1948

10 Claims. (Cl. 260—44)

The present invention relates to resin solutions suitable for making lacquers and to the manufacture thereof.

In my copending application, Ser. No. 101,681, filed June 27, 1949, is described a process for the manufacture of resin solutions suitable as raw materials for making lacquers bakeable at high temperatures and yielding very heat-resistant coatings, and prepared from a resinous derivative of a polyhydric phenol which derivative contains at least two ethylene oxide groups, wherein 1 mol of the ethylene oxide derivative is heated in the presence of a suitable organic solvent with from about ⅛ to at most ⅚ of one equivalent of a polybasic carboxylic acid, of which the carboxyl groups are separated from one another by at least two carbon atoms, or of an anhydride of such a carboxylic acid and with about 0.06 to 0.6 mol of dicyandiamide.

In one form of the process the heating operation is conducted in the presence of an aldehyde condensation product which is derived from a substance, such as melamine, urea, dicyandiamide, phenol or the like, capable of forming a hardenable condensate with formaldehyde, and contains etherified methylol groups, especially alkyl ethers of such methylol compounds, and, if desired, with the addition of a further quantity of dicyandiamide.

As one mol of the resinous ethylene oxide derivative there is to be understood herein 1 mol calculated as a hypothetical monomeric compound, which mol corresponds to the quantity of resin obtained by reaction of epichlorhydrin with 1 mol of the polyhydric phenol under the conditions of the Examples herein. By 1 equivalent of a polybasic carboxylic acid is meant the quantity corresponding to the formula $$\frac{\text{Mol}}{n}$$

where $n$ is equal to the number of carboxyl groups present in the molecule and "Mol" stands for molecular weight.

The present invention is based on the observation that resin solutions having substantially the same properties can be obtained by using instead of the dicyandiamide in the above process 0.03–0.3 mol of a polyamine containing at least two —NH$_2$ groups separated from one another by at least two carbon atoms.

As such polyamines there come into consideration aliphatic and also aromatic polyamines, for example, diethylene triamine, triethylene tetramine, 1:3-diaminobutane, para-phenylene diamine, benzidine or the like. Since the aforesaid amines generally have a powerful hardening effect smaller quantities are used than in the case of dicyandiamide. Furthermore, the addition of aldehyde condensation products containing etherified methylol groups is not essential, but they can be added in order, for example, to enhance the gloss and flow of the lacquers.

Lacquer films produced with resins prepared from such polyamines are generally of a somewhat dark colour.

The ethylene oxide resins used as starting materials are obtained in known manner by the action of epihalogenhydrins or dihalogenhydrins, especially epichlorhydrin or dichlorhydrin on phenols in an alkaline medium.

As phenols there come into consideration those containing at least 2 hydroxyl groups. Especially suitable are polyhydric polynuclear phenols of which the phenol nuclei are connected together by carbon bridges such, for example, as 4:4'-dihydroxydiphenyl-dimethyl-methane (of which the ethylene oxide derivative is referred to hereinafter for brevity as "dimethylmethane resin") and the like.

In admixture with the aforesaid polynuclear phenols there may be used polynuclear phenols of which the phenol nuclei are connected together by sulphur bridges, for example, 4:4'-dihydroxydiphenyl sulphone.

However, other polyvalent phenols may be used for preparing the ethylene oxide derivatives, for example resorcinol, hydroquinone, ortho:ortho'-diphenol or the like. Certain resinous phenol-aldehyde condensation products of the type of novolaks also yield useful ethylene oxide derivatives.

Experiments have shown that very good results are obtained with dimethyl methane resin, although lacquers prepared with the other ethylene oxide resins are equally useful for many purposes.

As polybasic carboxylic acids or anhydrides for use in the present invention there come into consideration aliphatic and cyclic carboxylic acids of which the carboxyl groups are separated from one another by at least two carbon atoms, such for example, as maleic acid, succinic acid, adipic acid, citric acid, sebacic acid, phthalic acid, maleic anhydride, succinic anhydride, phthalic anhydride and the like.

As aldehyde condensation products containing etherified methylol groups there may be used ethers, especially alkyl ethers, of methylol compounds, especially formaldehyde condensation products, of substances such as melamine, urea, dicyandiamide, phenol or the like, capable of forming hardenable condensates with formaldehyde. Especially important, however, are the alkyl ethers of methylol melamines and, although these are somewhat less important, alkyl ethers of methylol ureas. These ether resins may be used in the preformed state or may be formed from their components in the course of the process of the invention, provided that conditions in themselves known to favour the formation of ether resins are maintained.

The process of the invention may be carried out by first dissolving the ethylene oxide resin in a suitable solvent and then adding the remaining ingredients simultaneously or in succession, and bringing them into reaction by heat. The order in which the additions are made depends on practical considerations and is not confined to any particular system.

As suitable solvent there come into consideration organic solvents containing no free carboxyl groups, for example, members of the following groups: alcohols, ketones, hydrocarbons, chlorinated hydrocarbons, phenols, esters, ethers, glycol ethers and the like, which are advantageously used in the form of mixtures of at least two such solvents. It can be left to an expert to decide the best choice to make with regard to the boiling point and speed of evaporation in any particular case.

The following examples illustrate the invention. The dimethyl methane resin used in these examples is obtained by reacting one mol of 4:4'-dihydroxydiphenyl-dimethylmethane with about 1.65 mol of epichlorhydrin in an aqueous solution of sodium hydroxide at a temperature ranging from 50-100° C., and has a molecular weight of about 300 (see page 1). The parts are by weight:

Example 1

73 parts of adipic acid (about 0.5 mol) are added to a solution, prepared at about 120° C., of 300 parts of dimethylmethane resin (about 1 mol) in a mixture of 130 parts of cyclohexanol and 90 parts of ortho-dichlorobenzene. The mixture is stirred for 1 hour at about 120° C., and then, after the addition of 8.5 parts of triethylene tetramine (about 0.06 mol), the whole is stirred for a further 45 minutes at 120-130° C. The thickly fluid resin so obtained is taken up in a mixture of 100 parts of benzyl alcohol and 60 parts of butanol, and the whole is stirred for about 15 minutes longer at 100-110° C. The highly viscous resin solution so obtained can be diluted with the usual lacquer solvents to produce a finished lacquer.

Coatings produced from this lacquer by hardening with heat adhere very well, are yellow to brown in colour and are flexible, and they are resistant to solvents and can be subjected for long periods to temperatures up to 140° C. without becoming brittle. They are resistant to impact, flexing and scratching.

Similar coatings are obtained by using in this example, instead of the triethylene tetramine, 10 parts of diethylene triamine (about 0.1 mol).

By using, instead of adipic acid, 102 parts of sebacic acid (about 0.5 mol) and, instead of triethylene tetramine, 13.5 parts of 1:3-diaminobutane, (about 0.15 mol) there are obtained lacquer coatings which have substantially the same properties.

Example 2

300 parts of dimethylmethane resin (about 1 mol) are dissolved in a mixture of 130 parts of cyclohexanol and 200 parts of ortho-dichlorobenzene at about 120° C. After the addition of 73 parts of adipic acid (about 0.5 mol) the whole is stirred for 1 hour at about 120° C. 12 parts of benzidine (about 0.065 mol) are then added, and the solution is stirred for a further 45 minutes at 110-120° C. The rather highly viscous resin is stirred with 50 parts of benzyl alcohol for a further 10 minutes at about 110° C. The resin solution so obtained can be diluted with the usual lacquer solvents to produce a finished lacquer.

Coatings produced with this lacquer harden with heat to form very good adherent, flexible, brown-yellow lacquer coatings, which are very insensitive to over-hardening and prolonged heating up to about 140° C.

Example 3

100 parts of the resin produced as described in the third paragraph of Example 1 are mixed with 10 parts of a solution of about 75 per cent. strength by weight of hexamethylol melamine butyl ether in butanol and 10 parts of ethylene glycol monoethyl ether (ethyl-glycol), and the whole is stirred for 20 minutes at 100° C. The resulting resin solution is diluted in the usual manner to produce a finished lacquer.

Finished baked coatings produced with the above lacquer, in addition to being very insensitive to over-heating, have an especially fine gloss and good flow.

Example 4

A lacquer is prepared in the manner described in Example 1 from 300 parts of dimethylmethane resin (about 1 mol), 51 parts of sebacic acid (about 0.25 mol) and 6.6 parts of para-phenylene diamine (about 0.06 mol).

Lacquer coatings produced with the resulting lacquer in the usual manner have the same properties as the coatings described in Example 1, but they harden somewhat more rapidly.

Example 5

300 parts of dimethylmethane resin (about 1 mol) are dissolved in a mixture of 130 parts of cyclohexanol and 90 parts of ortho-dichlorobenzene. After the addition of 30 parts of maleic anhydride (about 0.3 mol) the mixture is stirred for 30 minutes at about 120° C., and then 8.5 parts of triethylene tetramine (about 0.06 mol) are added and the solution is stirred for a further 40 minutes at 120-130° C. The thickly fluid resin is stirred in a mixture of 100 parts of benzyl alcohol and 60 parts of butanol for 15 minutes at 100-110° C., whereby a highly viscous resin solution is obtained which can be diluted with the usual lacquer solvents to produce a finished lacquer.

The coatings produced with the above lacquer by hardening with heat adhere very well and are flexible, and they are also resistant to solvents and can be exposed for long periods to temperatures up to about 140° C. without becoming brittle. They are resistant to impact, flexing and scratching.

Lacquers having similar properties are obtained by using in this example, instead of maleic anhydride, 37 parts of phthalic anhydride, (about 0.25 mol) and, instead of triethylene tetramine, 12 parts of benzidine (about 0.065 mol) or 14 parts of diethylene triamine (about 0.14 mol).

Example 6

300 parts of dimethyl methane resin (about 1 mol) are dissolved in a mixture of 130 parts of cyclohexanol and 90 parts of ortho-dichlorobenzene. After the addition of 37 parts of maleic anhydride (about 0.37 mol) the mixture is stirred for 30 minutes at about 120° C. 15 parts of 1:3-diaminobutane (about 0.17 mol) are then added, and the solution is stirred for a further 45 minutes at 120–136° C. The thickly fluid resin is taken up in a mixture of 100 parts of benzyl alcohol and 60 parts of butanol and the whole is stirred for 15 minutes at 100–110° C., whereby a highly viscous resin solution is obtained which can be diluted in the usual manner to produce a finished lacquer.

The lacquer yields when hardened with heat very good adherent, flexible coatings which are insensitive to over-heating.

*Example 7*

100 parts of the resin prepared as described in the first paragraph of Example 6 are mixed with 10 parts of a solution of about 75 per cent. strength of hexamethylol melamine butyl ether in butanol and 10 parts of ethylene glycol monoethyl ether (ethylglycol) and the whole is stirred for 20 minutes at 110° C. The resin solution so obtained is diluted in the usual manner to produce a finished lacquer.

Finished baked coatings produced with the above lacquer are very insensitive to over-heating, and have an especially fine gloss and good flow.

What I claim is:

1. A process for the manufacture of a resin solution suitable as raw material for making lacquers bakeable at high temperatures and yielding very heat resistant coatings, and prepared from a resinous derivative of a polyhydric phenol, which derivative contains at least two ethylene oxide groups and which is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups with from about $1/8$ to at most $6/5$ of one equivalent of a substance of the group consisting of a polybasic carboxylic acid, of which the carboxyl groups are separated from one another by at least two carbon atoms, and an anhydride of such an acid, and with 0.03 to 0.3 mol of a polyamine containing two —$NH_2$ groups separated from one another by at least two carbon atoms.

2. A process for the manufacture of a resin solution suitable as raw material for making lacquers bakeable at high temperatures and yielding very heat resistant coatings, and prepared from a resinous derivative of a polyhydric polynuclear phenol, which derivative contains at least two ethylene oxide groups and which is obtained by reaction of a chlorhydrin selected from the group consisting of eipchlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups with from about $1/8$ to at most $6/5$ of one equivalent of substance of the group consisting of a polybasic carboxylic acid, of which the carboxyl groups are separated from one another by at least two carbon atoms, and an anhydride of such an acid, and with 0.03 to 0.3 mol of a polyamine containing two —$NH_2$ groups separated from one another by at least two carbon atoms.

3. A process for the manufacture of a resin solution suitable as raw material for making lacquers bakeable at high temperatures and yielding very heat resistant coatings, and prepared from a resinous derivative of a polyhydric polynuclear phenol of which the phenol nuclei are connected together by a carbon bridge, which derivative contains at least two ethylene oxide groups and which is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups with from about $1/8$ to at most $6/5$ of one equivalent of a substance of the group consisting of a polybasic carboxylic acid, of which the carboxyl groups are separated from one another by at least two carbon atoms, and an anhydride of such an acid, and with 0.03 to 0.3 mol of a polyamine containing two —$NH_2$ groups separated from one another by at least two carbon atoms.

4. A process for the manufacture of a resin solution suitable as raw material for making lacquers bakeable at high temperatures and yielding very heat resistant coatings, and prepared from a resinous derivative of 4:4'-dihydroxy-diphenyl-dimethylmethane, which derivative contains at least two ethylene oxide groups and which is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups with from about $1/8$ to at most $6/5$ of one equivalent of a substance of the group consisting of a polybasic carboxylic acid, of which the carboxyl groups are separated from one another by at least two carbon atoms, and an anhydride of such an acid, and with 0.03 to 0.3 mol of a polyamine containing two —$NH_2$ groups separated from one another by at least two carbon atoms.

5. A process for the manufacture of a resin solution suitable as raw material for making lacquers bakeable at high temperatures and yielding very heat resistant coatings, and prepared from a resinous derivative of a polyhydric phenol, which derivative contains at least two ethylene oxide groups and which is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups with from about $1/8$ to at most $6/5$ of one equivalent of a substance of the group consisting of a polybasic carboxylic acid, of which the carboxyl groups are separated from one another by at least two carbon atoms, and an anhydride of such an acid, and with 0.03 to 0.3 mol of a polyamine containing two —$NH_2$ groups separated from one another by at least two carbon atoms and wherein the heating is carried out also in the presence of an alkyl ether of a formaldehyde condensation product of a substance of the group consisting of melamine, urea, dicyandiamide and phenol.

6. A process for the manufacture of a resin solution suitable as raw material for making lacquers bakeable at high temperatures and yielding very heat resistant coatings, and prepared from a resinous derivative of a polyhydric polynuclear phenol, which derivative contains at least two ethylene oxide groups and which is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups with from about 1/8 to at most 6/8 of one equivalent of a substance of the group consisting of a polybasic carboxylic acid, of which the carboxyl groups are separated from one another by at least two carbon atoms, and an anhydride of such an acid, and with 0.03 to 0.3 mol of a polyamine containing two —NH₂ groups separated from one another by at least two carbon atoms and wherein the heating is carried out also in the presence of an alkyl ether of a formaldehyde condensation product of a substance of the group consisting of melamine, urea, dicyandiamide and phenol.

7. A process for the manufacture of a resin solution suitable as raw material for making lacquers bakeable at high temperatures and yielding very heat resistant coatings, and prepared from a resinous derivative of a polyhydric polynuclear phenol of which the phenol nuclei are connected together by a carbon bridge, which derivative contains at least two ethylene oxide groups and which is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups with from about 1/8 to at most 6/8 of one equivalent of a substance of the group consisting of a polybasic carboxylic acid, of which the carboxyl groups are separated from one another by at least two carbon atoms, and an anhydride of such an acid, and with 0.03 to 0.3 mol of a polyamine containing two —NH₂ groups separated from one another by at least two carbon atoms and wherein the heating is carried out also in the presence of an alkyl ether of a formaldehyde condensation product of a substance of the group consisting of melamine, urea, dicyandiamide and phenol.

8. A process for the manufacture of a resin solution suitable as raw material for making lacquers bakeable at high temperatures and yielding very heat resistant coatings, and prepared from a resinous derivative of 4:4'-dihydroxydiphenyldimethylmethane, which derivative contains at least two ethylene oxide groups and which is obtained by reaction of a chlorhydrin selected from the group consisting of epichlorhydrin and dichlorhydrin on the polyhydric phenol in an alkaline medium, in which process a quantity of the ethylene oxide derivative which contains 1 mol of bound polyhydric phenol is heated in the presence of an organic solvent free from carboxyl groups with from about 1/8 to at most 6/8 of one equivalent of a substance of the group consisting of a polybasic carboxylic acid, of which the carboxyl groups are separated from one another by at least two carbon atoms, and an anhydride of such an acid, and with 0.03 to 0.3 mol of a polyamine containing two —NH₂ groups separated from one another by at least two carbon atoms and wherein the heating is carried out also in the presence of an alkyl ether of a formaldehyde condensation product of a substance of the group consisting of melamine, urea, dicyandiamide and phenol.

9. A resin solution suitable as raw material for making lacquers bakeable at high temperatures and yielding very heat resistant coatings, consisting of (1) an organic solvent free from carboxyl groups and (2) a reaction product of (a) a quantity of a resinous ethylene oxide derivative which contains 1 mol of bound polyhydric phenol, which derivative contains at least two ethylene oxide groups and is obtained by reaction of a chlorhydrin selected from the group consisting of epichlorhydrin and dichlorhydrin on the polyhydric phenol in an alkaline medium, (b) from about 1/8 to at most 6/8 of one equivalent of a substance of the group consisting of a polybasic carboxylic acid, of which the carboxyl groups are separated from one another by at least two carbon atoms, and an anhydride of such an acid, and (c) about 0.03 to 0.3 mol of a polyamine containing two —NH₂ groups separated from one another by at least two carbon atoms, said resin solution being obtained by the process according to claim 1.

10. A resin solution suitable as raw material for making lacquers bakeable at high temperatures and yielding very heat resistant coatings, consisting of (1) an organic solvent free from carboxyl groups and (2) a reaction product of (a) a quantity of a resinous ethylene oxide derivative which contains 1 mol of bound polyhydric phenol, which derivative contains at least two ethylene oxide groups and is obtained by reaction of a chlorhydrin selected from the group consisting of epichlorhydrin and dichlorhydrin on the polyhydric phenol in an alkaline medium, (b) from about 1/8 to at most 6/8 of one equivalent of a substance of the group consisting of a polybasic carboxylic acid, of which the carboxyl groups are separated from one another by at least two carbon atoms, and an anhydride of such an acid, and (c) about 0.03 to 0.3 mol of a polyamine containing two —NH₂ groups separated from one another by at least two carbon atoms and also of (d) an alkyl ether of a formaldehyde condensation product of a substance of the group consisting of melamine, urea, dicyandiamide and phenol, said resin solution being obtained by the process according to claim 5.

GUSTAV H. OTT.

References Cited in the file of this patent

UNITED STATES PATENTS

| Number | Name | Date |
|---|---|---|
| 2,320,225 | Ericks | May 25, 1943 |
| 2,324,483 | Castan | July 20, 1943 |
| 2,444,333 | Castan | June 29, 1948 |
| 2,458,796 | Ott et al. | Jan. 11, 1949 |
| 2,528,932 | Wiles | Nov. 7, 1950 |

FOREIGN PATENTS

| Number | Country | Date |
|---|---|---|
| 251,647 | Switzerland | Sept. 1, 1948 |